Figure 1:
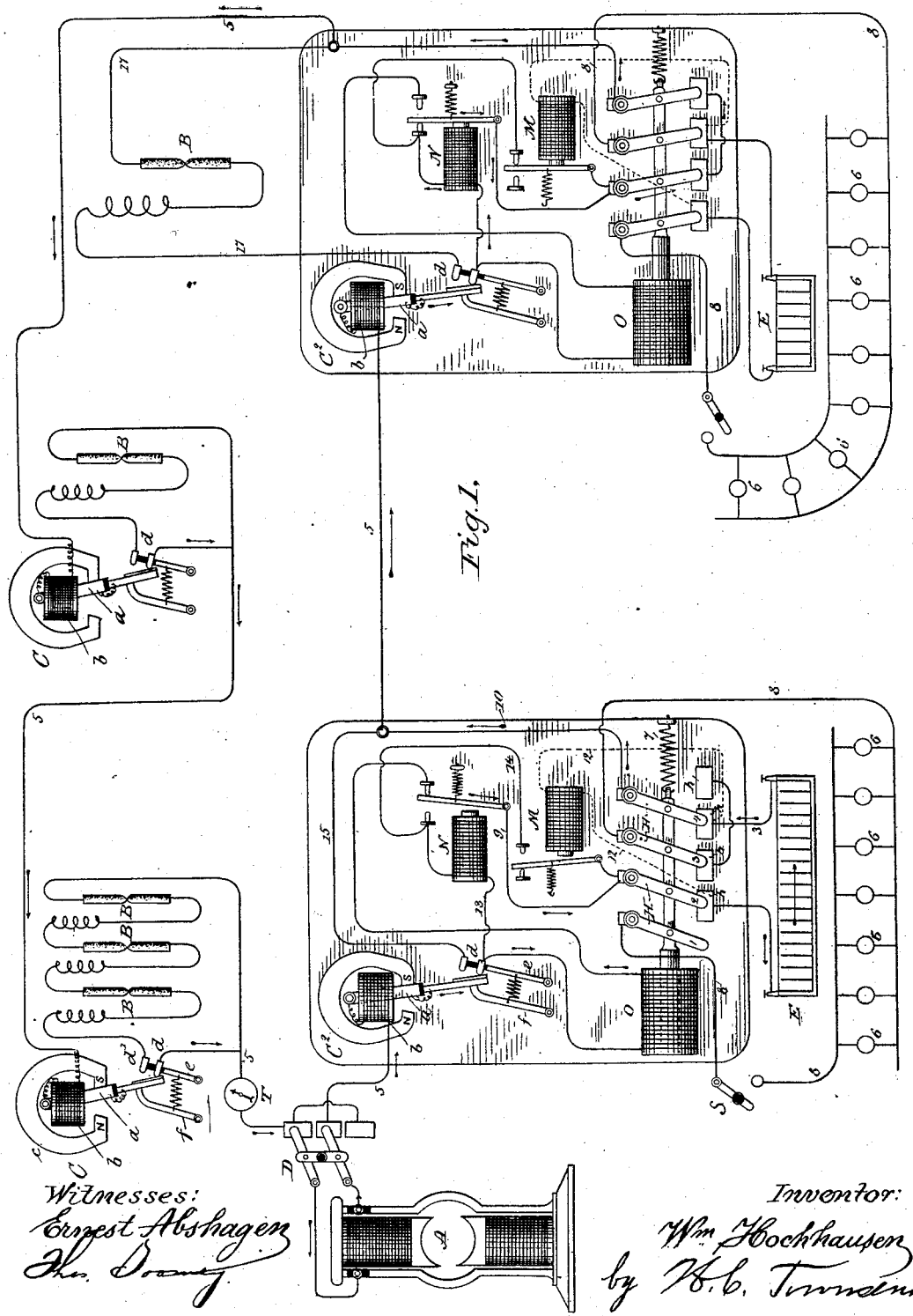

(No Model.) 2 Sheets—Sheet 1.

W. HOCHHAUSEN.
ELECTRIC DISTRIBUTION BY SECONDARY BATTERIES.

No. 367,630. Patented Aug. 2, 1887.

Witnesses:
Ernest Abshagen
Thos. Downey

Inventor:
Wm Hochhausen
by H. C. Townsend
Attorney.

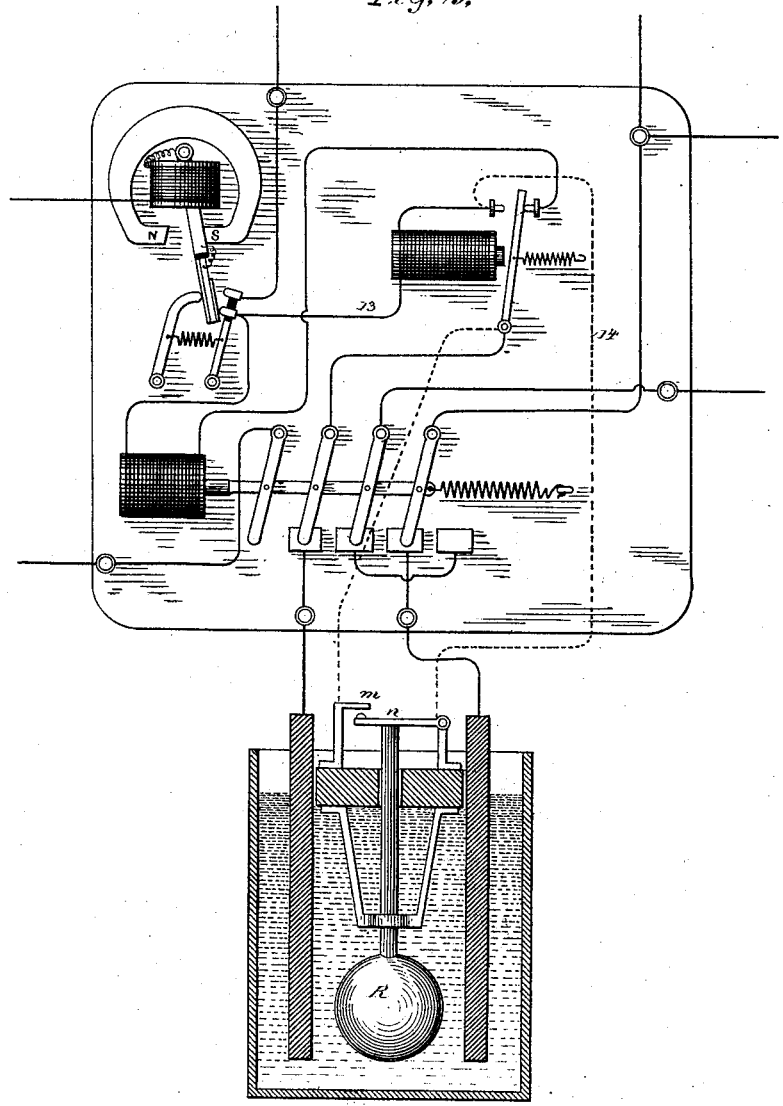

UNITED STATES PATENT OFFICE.

WILLIAM HOCHHAUSEN, OF NEW YORK, N. Y.

ELECTRIC DISTRIBUTION BY SECONDARY BATTERIES.

SPECIFICATION forming part of Letters Patent No. 367,630, dated August 2, 1887.

Application filed June 21, 1883. Serial No. 98,736. (No model.) Patented in England June 23, 1883, No. 3,123; in France September 13, 1883, No. 157,534; in Germany September 18, 1883, No. 29,849, and in Canada December 1, 1883, No. 18,231.

*To all whom it may concern:*

Be it known that I, WILLIAM HOCHHAUSEN, a citizen of the United States, and a resident of New York, in the county of New York and State of New York, have invented certain new and useful Improvements in Electric-Distribution Systems, of which the following is a specification.

My invention relates to systems of electric lighting in which both arc and incandescent lights are supplied from the same generator.

The primary object of my invention is to provide a system wherein the generative capacity of the dynamo-machine may be utilized in the day-time as well as at night, when the lights are required for use.

My invention consists, broadly, of a novel system of electric lighting in which secondary batteries are employed at various points on a circuit where a light is required, said batteries being charged from a dynamo-machine at a central station and serving to operate incandescent lights, electric-arc lamps also placed upon said circuit, and suitable polarized electro-magnetic switches in the main-line circuit that are controlled from the central or generating station, and serve to switch the arc lights and the secondary batteries into or out of circuit in such way that at night the arc lamps only shall be in circuit with the generator, while at other times the secondary batteries may be placed in circuit, the arc lamps being then cut out or disconnected.

A further object of my invention is to provide an arrangement whereby any number of secondary batteries placed in the same general circuit may be charged together from the same generator, and may each independently of the others be automatically switched out of the circuit when it has acquired its proper charge.

A further object of my invention is to provide a means whereby any number of secondary batteries supplied from the same generator may be switched out of circuit by a device located at or near the generator.

The object of my invention is also to provide a means of automatically shunting or disconnecting any secondary battery from the main or generating circuit when it has received its charge, and at the same time automatically connecting it to the lamp or other circuit containing translating devices which the battery is designed to operate.

My invention consists in certain novel combinations of apparatus that will be hereinafter described, and then set out in the claims.

My invention consists, also, in the combination, with the secondary battery, of a switch controlling the connection thereof with a charging-circuit, a polarized electro-magnet for operating or controlling the switch included in such charging-circuit, and a pole-changer of any suitable kind associated with the charging-generator for reversing the connections of the generator with the main line.

My invention consists, also, in the combination, with a secondary battery, of an electric switch operated by a change in the specific gravity of the battery-liquid, whereby when the battery has acquired a predetermined charge a circuit may be closed for disconnecting, short-circuiting, or for setting into operation apparatus for disconnecting or short-circuiting said battery automatically upon the acquirement by the battery of a predetermined charge.

I am aware that it is not new to employ an electro-magnet in a derived circuit around the battery for this purpose; but such device works upon an entirely different principle from my device, and although I have, for the purpose of elucidating certain portions of my invention, described and shown such a derived-circuit magnet, I do not lay any specific claim to the same.

In the accompanying drawings, Figure 1 is a diagram illustrating the general circuits of the system and some of the forms of devices for producing the desired switching operations that may be used for carrying out my invention. Fig. 2 illustrates another kind of automatic switch for automatically shunting or cutting out the secondary battery with which it is individually associated when such battery shall have acquired a predetermined charge.

Referring to Fig. 1, A indicates a dynamo-electric machine or other suitable generator of electricity, and 5 the general-circuit wire connected therewith, upon which the secondary batteries and electric-arc lamps are placed.

T is a galvanometer in the main circuit for indicating the condition of the current therein.

B B, &c., indicate electric-arc lamps of any desired or usual construction, which may be placed in circuit with the generator A in series connection, as usual, or may be disconnected from said circuit at pleasure by means of polarized electro-magnetic switches C, which are controlled in their operation by means of a pole changing or reversing key or apparatus, D, interposed in the general circuit 5 of the dynamo-generator A. The pole-changer D is of obvious and well-known construction, and operates in the well-known manner to reverse the flow of current from generator A upon the circuit 5.

The polarized switch C consists in the present instance of a pivoted vibratory lever, $a$, of soft iron or other magnetic material, which is surrounded by a coil, $b$, interposed constantly in the general circuit 5, and a permanent or other magnet, $c$, between the poles N S of which the lever $a$ vibrates. When the current flows in one direction on circuit 5, lever $a$ is drawn to one pole and there retained so long as the current continues to flow in the same direction. When the current is changed in direction by pole-changer D, the lever $a$ is drawn to the other pole, and there remains until current ceases to flow or the pole-changer D is shifted.

The polarized electro-magnet described is but one form of many that might be used. The construction and operation of this class of devices are well understood, and need not be described further in detail. Lever $a$ operates switch-contacts $d$, insulated from one another, and carried by a lever, $e$, between which and another lever, $f$, the end of lever $a$ works. Levers $e$ and $f$ are connected by a spring, which normally tends to draw them and the lever $a$ into an upright position. Contacts $d$ are connected, one directly with the general circuit wire 5 and the other with the same point through the lamp or lamps B. The lever $a$ is connected with the circuit-wire 5 on the other side of the lamp. In one position of said lever, as that shown in the drawings, the lamps are cut out of circuit. When the lever is drawn to the other extreme position, the upper contact, $d$, comes into contact therewith, the lower contact being at the same time withdrawn, so that the lamps B are introduced into circuit. No break of circuit occurs in this operation, as both contacts must bear against the lever $a$ at the instant of the shifting of connection.

E E indicate secondary batteries of any desired kind, which may be of the same or different size, and are intended to supply the current for working a number of incandescent electric lamps, 6, or other translating devices.

O indicates the electro-magnet, which serves to directly actuate a switch for connecting said battery into the general circuit 5, or disconnecting it therefrom and connecting it to the circuit of incandescent lamps or other apparatus indicated at 6. In the present instance the electro-magnet O is controlled by the electro-magnet M, preferably of high resistance, which, when the battery E is in the main circuit 5, is in a derived circuit around such battery. The retractor of the armature or equivalent movable portion of electro-magnet M is so adjusted that only when the battery has received its proper charge, and the evolution of gases has begun to take place, will electro-magnet M be enabled (through the current forced into it) to operate its armature or core against the force of the retractor. Electro-magnet O is in the main circuit 5, but is shunted or disconnected therefrom when magnet M acquires sufficient power. To keep the shunt or short circuit that is closed by magnet M intact, although the latter may lose its power, another electro-magnet, N, of low resistance, is provided and is placed in the shunt or cut-out circuit. The switch operated by electro-magnet O is of any suitable kind proper for connecting the battery E into the main-line circuit when the switch is in one position, and for breaking such connection in the other position of the switch, and simultaneously completing a branch circuit around the battery for the main line 5. In the present case said switch is also constructed to automatically complete the connection for battery E with the circuit supplying the lamps. This is desirable, but not necessary.

$C^2$ $C^2$ indicate polarized electro-magnetic switches of substantially the same construction as switches C, controlled from the generator-station by the pole changer or reverser D, and acting to disconnect the secondary battery and its apparatus and complete the circuit for the main conductor 5 around such apparatus. In the case of one of the switches $C^2$ an arc lamp, B, is shown associated therewith, and with the secondary-battery apparatus, in such way that the lamp is thrown into the circuit 5 when the battery is disconnected, and vice versa.

The switch operated by magnet O may be constructed as follows: G indicates a reciprocating bar connected with the movable core or armature of coils O, and provided with a suitable retractor, 7, acting in opposition to said coils. Bar G serves to impart movement to a series of contact-levers, H H H H, which work over a series of contact-plates, $h$ $h$ $h$ $h$, to two of which, as indicated, the two poles of the secondary battery are connected, while the remaining two plates $h$ are connected with one another. Two of the switch-levers H are connected with the conductors 8 8, forming the local or supply circuit for the lamps 6. The remaining two serve to connect the battery E into the main-supply circuit 5. The switch-contacts of the polarized switch $C^2$ are substantially the same as already described, but may be of any other suitable construction whereby the secondary battery apparatus may be connected into and out of the main charging-circuit by the operation of the pole-changer or current-reverser D.

The general circuits are as follows: In the position of switches $C^2$ shown, the secondary-battery apparatus is in the main circuit 5, and in the case of the apparatus shown at the left of the drawings the secondary battery is itself in the main supply-circuit 5.

The polarized switch-lever $a$ is against the lower contact, $d$, and the circuit through the apparatus is as follows: From main conductor 5 to the left of the apparatus through coil $b$ of the polarized switch-lever $a$, lower contact, $d$, electro-magnet O, back contact of armature-lever for magnet N, wire 9, and then through the secondary battery by means of the second and fourth of the contact-levers H and the first and third of contacts $h$, and by wire 10 to the continuation of the main circuit 5. The magnet M is connected in a derived circuit around the secondary battery by wires 12, (shown in dotted line,) which lead from the first and third of the contact-plates $h$. The levers H are held in the position shown by the attraction of the magnet O, which overcomes the retractive spring 7. When the battery is charged to such an extent that oxygen and hydrogen are set free, its counter electro-motive force suddenly increases, so that sufficient current will be forced through magnet M to draw forward its armature. The effect of this is to complete a short circuit for the coils O from contact $d$ through wire 13, magnet N, front stop for lever thereof, wire 14, front contact of armature for M, and to the lever H, to which coil O is connected by wire 9. The current is thus diverted from O, and the spring 7 for the bar G then draws the contact-levers H back into position, where the second and fourth levers will be disconnected from the secondary battery and will rest upon the second and fourth of the contacts $h$, which two latter contacts are directly connected, as shown, thus simultaneously cutting the battery E out of circuit and completing a branch circuit around said battery. The current now flows from contact $d$ through wire 13, magnet N, wire 14, armature of M, and by way of the connected contacts $h$ to wire 10. The armature of N is thereby drawn forward against its front contact-stop, thus completing a circuit for said magnet by wire 9, independent of the circuit as first completed by the magnet M through 14, so that even if the armature-lever of the latter magnet opens its contacts the main circuit and the shunt for O will be nevertheless intact. The armature of N in coming forward also breaks the circuit for coil O through its back contact. The condition of the parts as just described is shown in the secondary-battery apparatus at the right of the drawings, where the secondary battery is supposed to have acquired its charge and to have been automatically disconnected. When the lamps 6 are to be used, their circuit can be completed by the switch S. At other parts of the circuit the connections are, as indicated, through the shunt or short circuit, in the right-hand apparatus, around secondary battery and through the lower contacts for the polarized switches C, so as to cut out all of the arc lamps B. In this condition the main-line current passes through such secondary batteries as have not acquired their proper charge, but avoids all of the arc lamps.

As the various secondary batteries are charged they may singly and independently of one another be automatically switched out of circuit, as before described. When the arc lamps are to be used, the pole-changer D is operated and the polarized switches disconnect all the secondary battery apparatus and connect into the circuit the arc lamps. Under this condition the main circuit 5 is through the coil $b$, lever $a$, upper contact $d$, and short-circuit wire 15 of the secondary-battery station at the left of the drawings, the lower contact $d$ being broken at same time, thence by wire 5 to the coil $b$, lever $a$, upper contact $d$ of the apparatus at the right of drawings, and by wires 17 through the lamp B, thence by continuation of the main circuit 5, through the lamps B, controlled by switches C. It will be noted, in the automatic operation of a switching apparatus, that the lever of N in coming forward will break the circuit of magnet O; but said circuit will be completed at the time that the armature-lever $a$ is drawn to the right, because magnet N will have been disconnected by the operation of the polarized switch when the arc lamps are thrown into circuit, so that its lever will fall back and thus put the apparatus into condition such that when the lever $a$ is thrown back to connect in the secondary-battery apparatus the magnet O will be energized and will draw or operate the switch so that it will assume the position shown at the left of the drawings.

I do not limit myself to any particular construction of switch for producing the desired changes of circuit herein described, as the form of switch may be varied in many particulars and many other constructions may be used for producing the same changes of circuit. In this system, when a number of secondary batteries are in series in the main circuit 5 at various points, they will be automatically and independently shunted out by the controlling-magnets M as they become charged, since a variation of charge in any battery will only affect the magnet in derived circuit around it. Their currents may be then utilized in the ordinary way at any time. When the arc lamps are to be used at night, it is only necessary to reverse the direction of the current on the line by the pole-changer D, when the arc lamps will be thrown into circuit and the secondary-battery apparatus entirely disconnected. When the time arrives for utilizing the generator to charge the secondary battery, the pole-changer D is turned back and the polarized switches C $C^2$ are operated to connect in the secondary-battery apparatus and cut out the lamps B.

In Fig. 2 is shown one form of apparatus that may be used in carrying out that portion of my invention which consists in making the change in the specific gravity of the secondary-battery liquid produce the proper switching operations.

For the sake of simplicity I have herein shown the same apparatus as is shown in Fig. 1, the hydrometer or other apparatus working by a change in the specific gravity of the liquid being employed to close the same local circuit as is closed by the contacts controlled by magnet M of Fig. 1. This circuit is that from the wire joined to front contact-stop for magnet N, Fig. 1, to the pivot of the armature-lever for said magnet. The same circuit is indicated in Fig. 2 by the two dotted lines, one taken from the front stop of N to the frame supporting pivoted contact $n$, and the other from the pivot of armature-lever for N to the contact $m$, mounted on a suitable support.

R indicates a hydrometer-bulb of any desired construction immersed in the liquid of the secondary battery and having its stem guided in a suitable frame, as indicated. Said hydrometer acts, as indicated, upon one of the two contacts $m$ $n$, corresponding to the contacts closed by the action of magnet M, Fig. 1, and serves to close the same kind of a branch circuit, as clearly shown by the dotted lines around the magnet, which directly controls the switch for disconnecting the battery, and through the electro-magnet which keeps said branch circuit closed. When the charging of the battery has proceeded to the predetermined point, the hydrometer, owing to the consequent increase in the specific gravity of the battery-liquid, rises to a point at which it will close the contacts $m$ $n$, with the effect of cutting out the battery.

The action is in detail as follows: The switch being in position to close the circuit to the battery, it is held in such position by the action of the magnet O, whose core is attached to the switch-bar. When the contacts $m$ $n$ are closed, the completion of the circuit through them short-circuits the magnet O just the same as the contacts closed by magnet M produce the same effect, thus permitting the switch to disconnect the battery. At the same time, however, magnet N is energized, and, drawing up its lever, holds the shunt closed, the operation in detail being precisely the same from the time of closing the contacts $m$ $n$ that it is in Fig. 1 from the time of closing of contact by the armature for magnet M.

I do not limit myself to the particular kinds of circuits or apparatus affected by the closing of $m$ $n$, the gist of the invention consisting in making the hydrometer effect the desired switching of the battery through any suitable apparatus. Nor do I limit myself to any particular kind of hydrometer or apparatus to be effected by the change in the specific gravity of the liquid.

What I claim as my invention is—

1. An electric-lighting system comprising on the same general circuit arc lamps, secondary batteries for supplying current to incandescent lamps, switches for connecting in the secondary batteries and simultaneously disconnecting the arc lamps, and vice versa, electro-magnets connected with the main or charging circuit for controlling said switches, and means at a central or generating station for controlling said electro-magnets.

2. A combined arc and incandescent system of electric lighting comprising secondary batteries, incandescent lamps to be operated thereby and connected therewith through suitable conductors, electric-arc lamps, a main or supply conductor for conveying current directly to said arc lamps or to said secondary batteries for charging the same, polarized electro-magnetic switches, whereby the secondary batteries may be connected to the main conductor, and the arc lamps at the same time disconnected, and a circuit-controller in the main circuit at the central station for controlling said switches.

3. The combination, with secondary-battery apparatus, of a polarized switch whose coils are in the main or charging circuit of said battery, a dynamo-electric machine supplying the current for charging said battery, and a pole-changer for reversing the connections of the generator so as to operate the switch and connect in or disconnect the secondary battery.

4. The combination, on the same general circuit and connected with the same generator, of electric-arc lamps, a secondary battery or batteries, incandescent-electric lamps connected with said batteries, polarized switches arranged, as described, to connect the batteries and the arc lamps into circuit in turn, and a pole-changer for reversing the connection of the dynamo-machine with the general circuit.

5. The combination, in the same system, of a generator of electricity, an electric lamp or lamps in one set of connections from the circuit supplied by said generator, a secondary battery or batteries in another set of connections, incandescent lamps or other translating devices in a sub-circuit supplied by the discharge-current from said battery, a polarized electro-magnetic switch in circuit with the generator and controlling the connections of the lamp and battery with the main line, and a pole-changer for reversing the connection of the dynamo-machine.

6. The combination, substantially as described, of a dynamo-electric machine, a pole-changer controlling the connection thereof with the main circuit, an electric lamp or lamps on the main circuit, a switch controlling the connection of said lamp or lamps and operated by a polarized electro-magnet in the main circuit, and a secondary battery whose connection is also controlled by a switch and polarized main circuit electro-magnet, said battery being connected with a sub-circuit, through which it may discharge when it is disconnected from the main line, all as described, so that when the current flows in one direction the battery will be out of circuit and the lamp in circuit, while, vice versa, when the current flows in the other direction the lamps will be in and the secondary battery out.

7. The combination, with a secondary battery, of a reciprocating switch, retractor therefor, and operating electro-magnet, two sets of contacts for said switch, one controlling the connection of the battery with a charging-circuit, the other with a circuit supplying electric lamps or other translating devices, and an electro-magnet in a derived circuit around the battery, when it is connected to the charging-circuit, for shunting or disconnecting the switch-magnet, as and for the purpose described.

8. The combination, with a secondary battery, of switch contact points or surfaces for closing a branch around the battery when it acquires a predetermined charge, and an electro magnet or coil in said branch, which serves to actuate contacts also in said branch, whereby the same may be kept closed, although the means whereby such branch is first closed may cease to act.

9. The combination, with a secondary battery, of a high-resistance derived-circuit magnet, a branch circuit controlled thereby, and a magnet-coil in said branch, which acts upon contacts, whereby the branch may be kept closed after the derived-circuit magnet decreases in power.

10. The combination, with a secondary battery, of a switch-magnet that when energized connects the same to a charging-circuit, and when de-energized disconnects it therefrom, means for shunting or breaking the circuit of said magnet when the battery has acquired a predetermined charge, an electric switch that serves to connect or disconnect said switch-magnet with the main or charging circuit, and means at a central station for controlling said latter switch.

11. The combination, with a secondary battery, of a cut-out or disconnecting switch, and means for operating said switch upon a change in the specific gravity of the battery-liquid, as and for the purpose described.

Signed at New York, in the county of New York and State of New York, this 12th day of June, A. D. 1883.

WILLIAM HOCHHAUSEN.

Witnesses:
   THOS. TOOMEY,
   M. M. FRIEND.